(12) United States Patent
Qian et al.

(10) Patent No.: US 11,126,260 B2
(45) Date of Patent: Sep. 21, 2021

(54) CONTROL METHOD AND APPARATUS OF INTELLIGENT DEVICE, AND STORAGE MEDIUM

(71) Applicant: BAIDU ONLINE NETWORK TECHNOLOGY (BEIJING) CO., LTD., Beijing (CN)

(72) Inventors: Lu Qian, Beijing (CN); Gang Zhang, Beijing (CN); Shasha Wang, Beijing (CN); Mingwei Li, Beijing (CN); Yibo Chen, Beijing (CN); Fenglei Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/732,011

(22) Filed: Dec. 31, 2019

(65) Prior Publication Data
US 2021/0096642 A1    Apr. 1, 2021

(30) Foreign Application Priority Data
Sep. 27, 2019   (CN) .......................... 201910927956.9

(51) Int. Cl.
*G06F 3/01*      (2006.01)
*G06F 3/16*      (2006.01)

(52) U.S. Cl.
CPC .............. *G06F 3/013* (2013.01); *G06F 3/165* (2013.01)

(58) Field of Classification Search
CPC . G06F 3/013; G06F 3/165; G06F 3/01; G06F 3/011
See application file for complete search history.

(56) References Cited

U.S. PATENT DOCUMENTS

| 4,950,069 | A  | * | 8/1990 | Hutchinson | A61B 3/113 351/210 |
| 6,088,017 | A  | * | 7/2000 | Tremblay | G06F 3/011 345/156 |
| 6,373,961 | B1 | * | 4/2002 | Richardson | G06F 3/013 345/8 |

(Continued)

FOREIGN PATENT DOCUMENTS

| EP | 2618626 A1 | 7/2013 |
| JP | 2013114691 A | 6/2013 |

(Continued)

OTHER PUBLICATIONS

European Patent Application No. 19219772.1 extended Search and Opinion dated Jul. 14, 2020, 9 pages.

(Continued)

*Primary Examiner* — Jung-Mu T Chuang
(74) *Attorney, Agent, or Firm* — Lathrop GPM LLP

(57) ABSTRACT

Embodiments of the present disclosure disclose a control method and apparatus of an intelligent device, and a storage medium. The control method includes: determining a state of a target function to acquire target function state information; detecting an operation of a user gazing at a local screen to acquire gazing operation information; and controlling the state of the target function to switch according to the gazing operation information and the target function state information.

9 Claims, 3 Drawing Sheets

(56) References Cited

U.S. PATENT DOCUMENTS

| | | | | |
|---|---|---|---|---|
| 7,091,471 | B2* | 8/2006 | Wenstrand | G06F 1/3203 250/221 |
| 7,222,042 | B2* | 5/2007 | Fishman | H04B 10/07 340/527 |
| 7,233,684 | B2* | 6/2007 | Fedorovskaya | G06K 9/6293 382/118 |
| 7,711,883 | B2* | 5/2010 | Son | H04N 21/4104 709/224 |
| 7,808,555 | B2* | 10/2010 | Aratani | H04N 5/775 348/333.05 |
| 8,022,989 | B2* | 9/2011 | Aoki | H04L 65/4061 348/158 |
| 8,085,902 | B2* | 12/2011 | Bonfiglio | A61B 6/00 378/115 |
| 8,185,845 | B2* | 5/2012 | Bjorklund | G06F 3/017 715/863 |
| 8,552,996 | B2* | 10/2013 | Morita | G06F 3/04883 178/18.03 |
| 8,593,375 | B2* | 11/2013 | Maltz | G06F 3/013 345/8 |
| 8,643,680 | B2* | 2/2014 | Baldwin | G06F 3/013 345/684 |
| 8,672,482 | B2* | 3/2014 | Vertegaal | G06F 3/14 351/209 |
| 8,678,589 | B2* | 3/2014 | Sakata | G06K 9/0061 351/209 |
| 8,872,765 | B2* | 10/2014 | Higuchi | G05B 19/02 345/156 |
| 8,913,004 | B1* | 12/2014 | Bozarth | G09G 5/006 345/156 |
| 9,071,727 | B2* | 6/2015 | Chou | H04N 7/148 |
| 9,092,051 | B2* | 7/2015 | Park | G06F 3/01 |
| 9,383,914 | B2* | 7/2016 | Clements | G06F 3/013 |
| 9,507,412 | B2* | 11/2016 | Herold | G02B 27/017 |
| 9,507,418 | B2* | 11/2016 | Yu | G06F 3/013 |
| 9,568,997 | B2* | 2/2017 | Wilairat | H04N 21/4223 |
| 9,575,640 | B2* | 2/2017 | Dempski | G06F 3/04842 |
| 9,652,047 | B2* | 5/2017 | Mullins | G06F 3/017 |
| 9,654,768 | B2* | 5/2017 | Qin | H04N 13/398 |
| 9,678,646 | B2* | 6/2017 | Joe | G06F 3/04845 |
| 9,693,684 | B2* | 7/2017 | Lopez | G06F 1/1626 |
| 9,703,349 | B2* | 7/2017 | Gelonese | G06F 1/325 |
| 9,720,497 | B2* | 8/2017 | Jang | G06T 15/20 |
| 9,817,475 | B2* | 11/2017 | Lee | G06F 3/013 |
| 9,851,788 | B2* | 12/2017 | Kim | G06F 3/013 |
| 10,007,352 | B2* | 6/2018 | Poulos | G02B 27/0103 |
| 10,120,438 | B2* | 11/2018 | Osman | G06F 1/3231 |
| 10,242,379 | B2* | 3/2019 | Ha | G06Q 30/0242 |
| 10,324,524 | B2* | 6/2019 | Choi | G06F 3/013 |
| 10,394,316 | B2* | 8/2019 | Todeschini | G06F 3/013 |
| 10,630,795 | B2* | 4/2020 | Aoki | G06F 9/4856 |
| 2002/0008716 | A1* | 1/2002 | Colburn | G06T 13/40 715/706 |
| 2007/0040892 | A1* | 2/2007 | Aoki | H04L 65/4061 348/14.01 |
| 2011/0026678 | A1* | 2/2011 | Bonfiglio | A61B 6/00 378/114 |
| 2011/0141010 | A1* | 6/2011 | Sakata | G06K 9/0061 345/156 |
| 2011/0175932 | A1* | 7/2011 | Yu | G06F 3/02 345/661 |
| 2012/0019662 | A1* | 1/2012 | Maltz | G02B 27/017 348/158 |
| 2012/0256967 | A1* | 10/2012 | Baldwin | G06F 3/0485 345/684 |
| 2012/0300061 | A1* | 11/2012 | Osman | G06F 1/3265 348/135 |
| 2013/0106681 | A1* | 5/2013 | Eskilsson | G06F 3/013 345/156 |
| 2013/0135196 | A1* | 5/2013 | Park | G06F 3/0483 345/156 |
| 2013/0141518 | A1* | 6/2013 | Chou | H04N 7/148 348/14.08 |
| 2013/0300645 | A1* | 11/2013 | Fedorov | G06F 3/01 345/156 |
| 2014/0138544 | A1* | 5/2014 | Sprague | G06F 3/013 250/341.8 |
| 2014/0201126 | A1* | 7/2014 | Zadeh | A61B 5/165 706/52 |
| 2014/0232638 | A1* | 8/2014 | Choi | G06F 3/013 345/156 |
| 2014/0267034 | A1* | 9/2014 | Krulce | G06F 1/3265 345/158 |
| 2014/0285019 | A1* | 9/2014 | Gelonese | G06F 1/3246 307/39 |
| 2014/0313129 | A1* | 10/2014 | Elvesjo | G06F 1/3265 345/156 |
| 2015/0042555 | A1* | 2/2015 | Vertegaal | G06F 3/011 345/156 |
| 2015/0050629 | A1* | 2/2015 | Pease | A63B 69/0097 434/247 |
| 2015/0116212 | A1* | 4/2015 | Freed | G06F 1/1686 345/156 |
| 2015/0169053 | A1* | 6/2015 | Bozarth | G06F 1/3231 345/156 |
| 2015/0232030 | A1* | 8/2015 | Bongwald | G02B 27/0093 348/115 |
| 2015/0296025 | A1* | 10/2015 | Okabayashi | G06F 9/44526 709/201 |
| 2016/0088144 | A1* | 3/2016 | Logan | H04L 51/02 455/412.1 |
| 2016/0098093 | A1* | 4/2016 | Cheon | G06F 3/038 345/156 |
| 2016/0225012 | A1* | 8/2016 | Ha | G06Q 30/0277 |
| 2016/0246384 | A1* | 8/2016 | Mullins | G06F 3/011 |
| 2017/0052595 | A1* | 2/2017 | Poulos | G06F 3/013 |
| 2017/0172675 | A1* | 6/2017 | Jarc | A61B 17/00234 |
| 2017/0177079 | A1* | 6/2017 | George-Svahn | G06F 3/012 |
| 2017/0242471 | A1* | 8/2017 | Ma | G06F 3/013 |
| 2019/0005698 | A1* | 1/2019 | Chae | A61B 8/4254 |
| 2019/0250707 | A1* | 8/2019 | Kondo | H04N 5/33 |
| 2019/0373127 | A1* | 12/2019 | Tsuji | G06F 3/1221 |

FOREIGN PATENT DOCUMENTS

| | | |
|---|---|---|
| JP | 2013140540 A | 7/2013 |
| KR | 20130059768 A | 6/2013 |

OTHER PUBLICATIONS

Japanese Patent Application No. 2019-238692, Office Action dated Mar. 2, 2021, 3 pages.

Japanese Patent Application No. 2019-238692, English translation of Office Action dated Mar. 2, 2021, 4 pages.

Korean Patent Application No. 10-2019-0175599, Office Action dated Jun. 28, 2021, 5 pages.

Korean Patent Application No. 10-2019-0175599, English translation of Office Action dated Jun. 28, 2021, 5 pages.

* cited by examiner

CONTROL METHOD AND APPARATUS OF INTELLIGENT DEVICE, AND STORAGE MEDIUM

CROSS-REFERENCE TO RELATED APPLICATION

The present application is based upon and claims priority to Chinese Patent Application No. 201910927956.9, filed on Sep. 27, 2019, the entire contents of which are incorporated herein by reference.

FIELD

Embodiments of the present disclosure relate to the field of data processing, more particularly, to an artificial intelligence (AI) technology. Specifically, embodiments of the present disclosure provide a control method and apparatus of an intelligent device, and a storage medium.

BACKGROUND

An intelligent speaker has rich functions for realizing video calls, listening to songs and watching videos, early education companions, life assistants, an intelligent home control and the like. For providing better AI experience for a user, the intelligent speaker is provided with a wake-up-free function so as to automatically wake up the device according to user requirements.

Typically, the wake-up-free function of the intelligent speaker is automatically deactivated after a fixed time (e.g., 30 s).

However, a deactivating way of the wake-up-free function has a following problem: a constant-time deactivating way is not flexible enough and cannot meet individual requirements of various users.

SUMMARY

Embodiments of the present disclosure provide a control method and apparatus of an intelligent device, and a storage medium.

Embodiments of the present disclosure provides a control method of an intelligent device, including: determining a state of a target function to acquire target function state information; detecting an operation of a user gazing at a local screen to acquire gazing operation information; and controlling the state of the target function to switch according to the gazing operation information and the target function state information.

The technical solution of embodiments of the present disclosure also provides a control apparatus of the intelligent device, including: one or more processors; a memory storing instructions executable by the one or more processors; in which the one or more processors are configured to: determine a state of a target function to acquire target function state information; detect an operation of a user gazing at a local screen to acquire gazing operation information; and control the state of the target function to switch according to the gazing operation information and the target function state information.

Embodiments of the present disclosure also provide a non-transitory computer readable storage medium having computer instructions stored thereon, the computer instructions are configured to cause the computer to perform a control method of an intelligent device provided in embodiments of the present disclosure. The method includes: determining a state of a target function to acquire target function state information; detecting an operation of a user gazing at a local screen to acquire gazing operation information; and controlling the state of the target function to switch according to the gazing operation information and the target function state information.

BRIEF DESCRIPTION OF THE DRAWINGS

The accompanying drawings aim at providing a better understanding of the present disclosure and are not intended to limit the present disclosure, in which.

DETAILED DESCRIPTION

The following description of the exemplary embodiments of the present disclosure, taken in conjunction with the accompanying drawings, includes various details of embodiments of the present disclosure for understanding, which are to be considered exemplary only. Accordingly, those ordinary skilled in the art should understand that various changes and modifications of the embodiments described herein can be made without departing from the scope and spirit of the present disclosure. Also, descriptions of well-known functions and constructions are omitted in the following description for clarity and conciseness.

Embodiment 1

Figure 1:
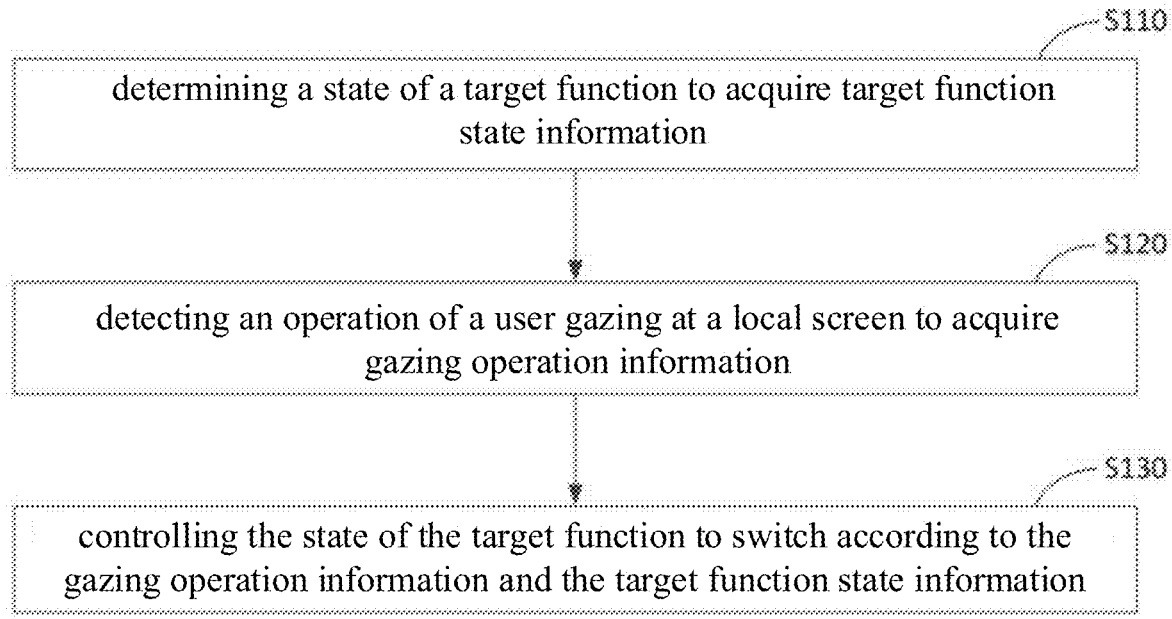
FIG. 1 is a flow chart of a control method of an intelligent device according to Embodiment 1 of the present disclosure.

FIG. 1 is a flow chart of a control method of an intelligent device according to Embodiment 1 of the present disclosure. The embodiment may be applied to a situation of delaying the deactivation and activation (waking up) of a target function in the intelligent device according to user's requirements. The method may be performed by a control apparatus of an intelligent device, which may be implemented by means of software and/or hardware. Referring to FIG. 1, the control method of the intelligent device provided in this embodiment includes the following.

At block S110, a state of a target function is determined to acquire target function state information.

The target function may be any function of the device.

Typically, the target function is a wake-up-free function of an intelligent speaker.

The target function may be in an ON state (working state) or an OFF state (closing state).

At block S120, an operation of a user gazing at a local screen is detected to acquire gazing operation information.

The local screen refers to a screen of a device having the target function.

The operation of the user gazing at the local screen refers to that the user gazes at the local screen.

At block S130, the state of the target function is controlled to switch according to the gazing operation information and the target function state information.

Based on the operation of the user gazing at the local screen, gazing operation information may be acquired, and the gazing operation information includes: information on whether the user is gazing at the local screen, a duration of the user gazing at the local screen, etc.

The target function state information indicates that the target function is in the ON state or the OFF state.

The state of the target function may be switched from the ON state to the OFF state or switched from the OFF state to the ON state.

Specifically, controlling the state of the target function to switch according to the gazing operation information and the target function state information includes the following.

When the target function state information indicates the OFF state and the duration of the user gazing at the local screen exceeds a gazing duration, the target function is switched from the OFF state to the ON state.

When the target function state information indicates an ON state, and the duration of a gazed point of the user leaving the local screen exceeds a leaving duration (the user does not gaze at the local screen for a time period which exceeds the leaving duration), the target function is switched from the ON state to the OFF state.

The technical solution of embodiments of the present disclosure may realize the following beneficial effects: a user's requirement for switching the state of the target function is identified according to the user's gazing operation for the local screen, and the state of the target function is switched according to the user's requirement and the state of the target function. Therefore, the automatic and flexible control of the target function state is realized, and the individual requirements of the various users are met.

Further, controlling the state of the target function to switch according to the gazing operation information and the target function state information includes the following.

When the target function state information indicates the OFF state and the target function is an automatic deactivation (active closing), the duration of the user gazing at the local screen is determined.

When the duration exceeds a second duration, the state of the target function is switched from the OFF state to the ON state.

The automatic deactivation refers to a deactivation triggered by the device automatically, and is not the deactivation triggered by the user by sending a deactivating instruction.

The second duration refers to a maximum duration that the user may gaze at the local screen without initiating the target function.

Based on this technical feature, the technical solution of embodiments of the present disclosure may realize the following beneficial effects: a requirement of the user on the target function may be determined according to the duration of the user gazing at the local screen. According to the requirement of the user on the target function, an automatic deactivation state of the target function is waked up, so that an automatic wake-up of the target function is realized.

Since the automatic deactivation is triggered according to the gazing operation of the user at the local screen, the automatic deactivation is generally a state in which the user temporarily does not need the target function. Therefore, the automatic wake-up of the automatic deactivation state may meet an intermittent use requirement of the user, and further improve the user experience.

Further, controlling the state of the target function to switch according to the gazing operation information and the target function state information includes the following.

When the target function state information indicates the OFF state and the target function is a manual deactivation (passive closing), the target function is controlled to remain in the OFF state to refuse to be waked up through the gazing operation information; in which the manual deactivation is to deactivate the target function in response to the deactivating command of the user.

Based on this technical feature, the technical solution of embodiments of the present disclosure may realize the following beneficial effects: since the manual deactivation is a deactivation triggered by the user sending a deactivating instruction, and usually the deactivation is triggered by the user when the target function is not used for a long time, the embodiment may avoid a failure wake-up of the target function by rejecting the automatically waking up the manual deactivation state of the target function, thereby improving a wake-up accuracy of the target function.

Embodiment 2

Figure 2:
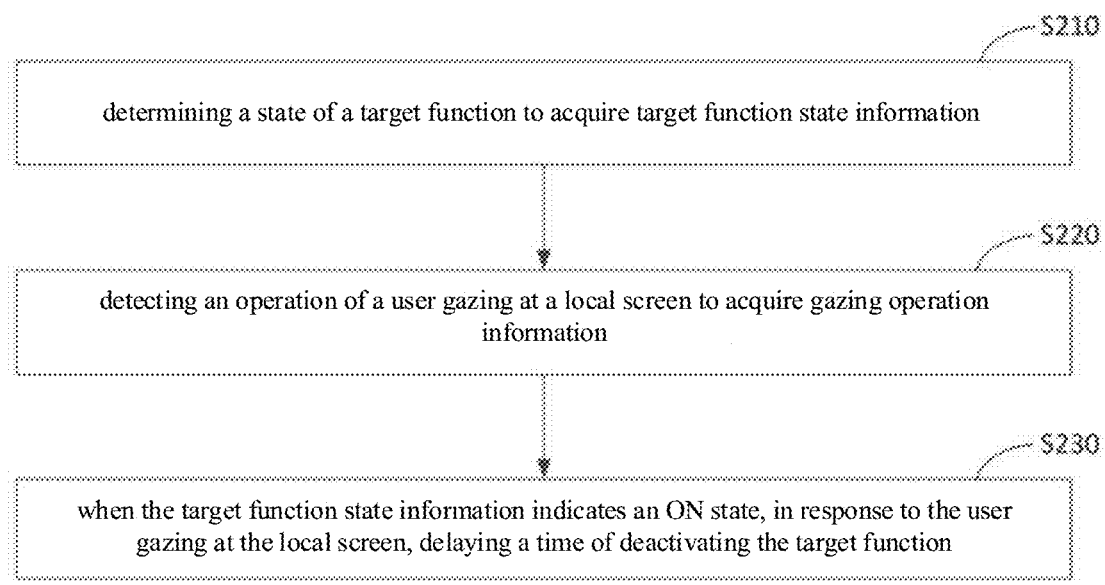
FIG. 2 is a flow chart of a control method of an intelligent device according to Embodiment 2 of the present disclosure.

FIG. 2 is a flow chart of a control method of an intelligent device according to Embodiment 2 of the present disclosure. The embodiment is an alternative solution proposed on the basis of the above-described embodiment. Referring to FIG. 2, the control method includes the following.

At block S210, a state of the target function is determined to acquire target function state information.

At block S220, an operation of the user gazing at the local screen is detected to acquire gazing operation information.

At block S230, when the target function state information indicates an ON state, in response to the user gazing at the local screen, a time of deactivating the target function is delayed.

Specifically, when the target function state information indicates the ON state, in response to the user gazing at the local screen, delaying the time of deactivating the target function includes: when the target function state information indicates the ON state, in response to the user gazing at the local screen, a determined current deactivating time is delayed for a set delaying duration.

For example, the determined current deactivating time is 1 minute later (i.e., the target function will be deactivated after 1 minute), when the target function state information indicates the ON state, in response to the user gazing at the local screen, the current deactivating time is delayed by 1 minute and 30 seconds (i.e., the target function will be deactivated after 1.5 minutes).

Optionally, delaying the time of deactivating the target function includes: starting timing from a starting point of the user gazing at the local screen for a last time; and in response to a timing result exceeding a first duration, deactivating the target function automatically.

The first duration is the shortest duration of the user not gazing at the local screen when the user needs to deactivate the target function.

Based on this technical feature, the technical solution of embodiments of the present disclosure may realize the following beneficial effects. By starting timing from a starting point of the user gazing at the local screen for a last time; and in response to a timing result exceeding a first duration, deactivating the target function automatically, it may be achieved that the user's requirement is determined as deactivating the target function if the duration of the user looking away from the local screen exceeds the first duration, and the target function is deactivated accordingly, such that the user's requirement may be satisfied.

In order to improve the user's perception of time addition, a time-addition text and a time-addition animation are displayed upon detecting that the user starts to gaze at the local screen.

Upon detecting that the duration of the user gazing at the local screen exceeds a set gazing duration, the time-addition text is stopped to be displayed, and only the time-addition animation is displayed until the target function is deactivated.

The technical solution of embodiments of the present disclosure may realize the following beneficial effects: when the target function state information indicates the ON state, i.e., the target function is in a working state, in response to the user gazing at the local screen, the time of deactivating the target function is delayed, such that the user's requirement of continuously using the target function when the user gazes at the screen in the process that the target function is in the working state may be satisfied. By delaying the time of deactivating the target function accordingly, the user's requirements may be satisfied.

Embodiment 3

The present embodiment is an alternative implementation provided on the basis of the above embodiments, in which the target function is a wake-up-free function in the intelligent speaker. The control method of the intelligent device provided in this embodiment may realize the time addition of deactivating the wake-up-free function, and may wake up of the wake-up-free function.

The time addition of deactivating the wake-up-free function may be described as follows.

When the wake-up-free function is in an ON state, i.e., the wake-up-free function is in a working state, upon detecting that the user gazes at a screen of the intelligent speaker, the timing of the deactivating duration is reset.

Upon detecting that the user gazes at the screen of the intelligent speaker continuously, the timing of the deactivating duration is set to start from the last time when the gazing of the user is detected. In other words, the timing of the deactivating duration is started from a starting point of the user gazing at the local screen for a last time.

After the timing is finished, the wake-up-free function is deactivated.

Waking up of the wake-up-free function may be described as follows.

When the wake-up-free function is in the OFF state, upon detecting that the user gazes at the screen of the intelligent speaker, the wake-up-free function is re-activated.

Figure 3:
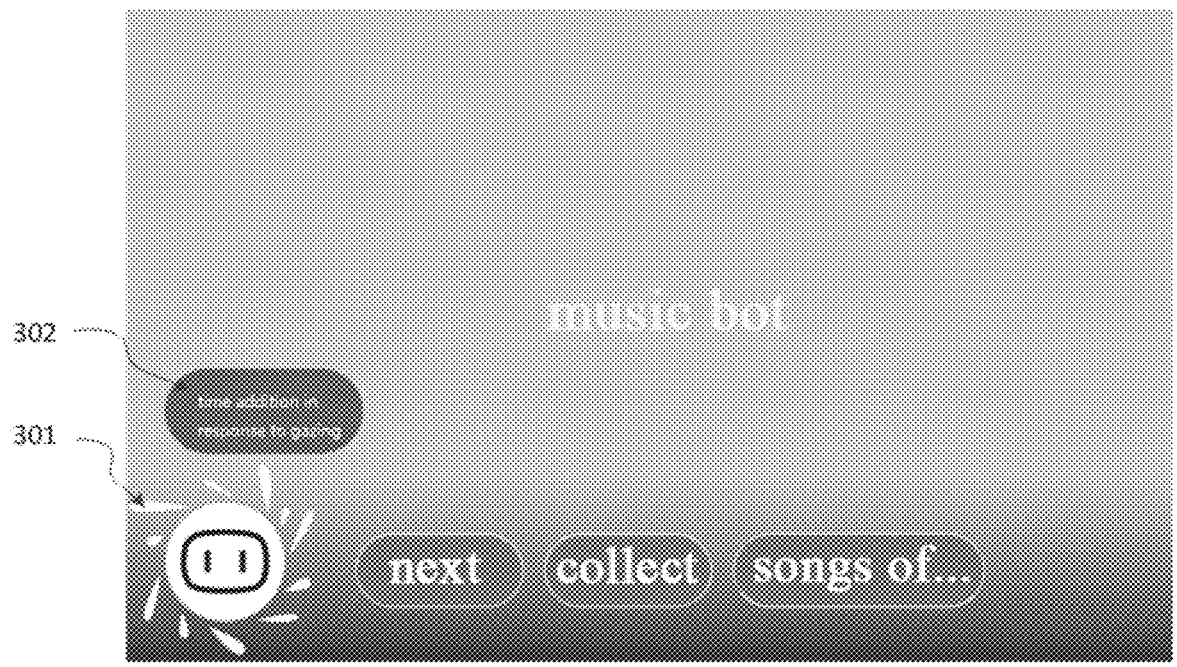
FIG. 3 is a schematic diagram of a display effect of a time-addition animation and a time-addition text according to Embodiment 3 of the present disclosure.

In order to displaying a dynamic effect for the wake-up-free function when the device detects the gazing of the user successfully, when the time addition for deactivating the wake-up-free function is triggered, a time-addition animation 301 and a time-addition text 302 are displayed as illustrated in FIG. 3.

Figure 4:
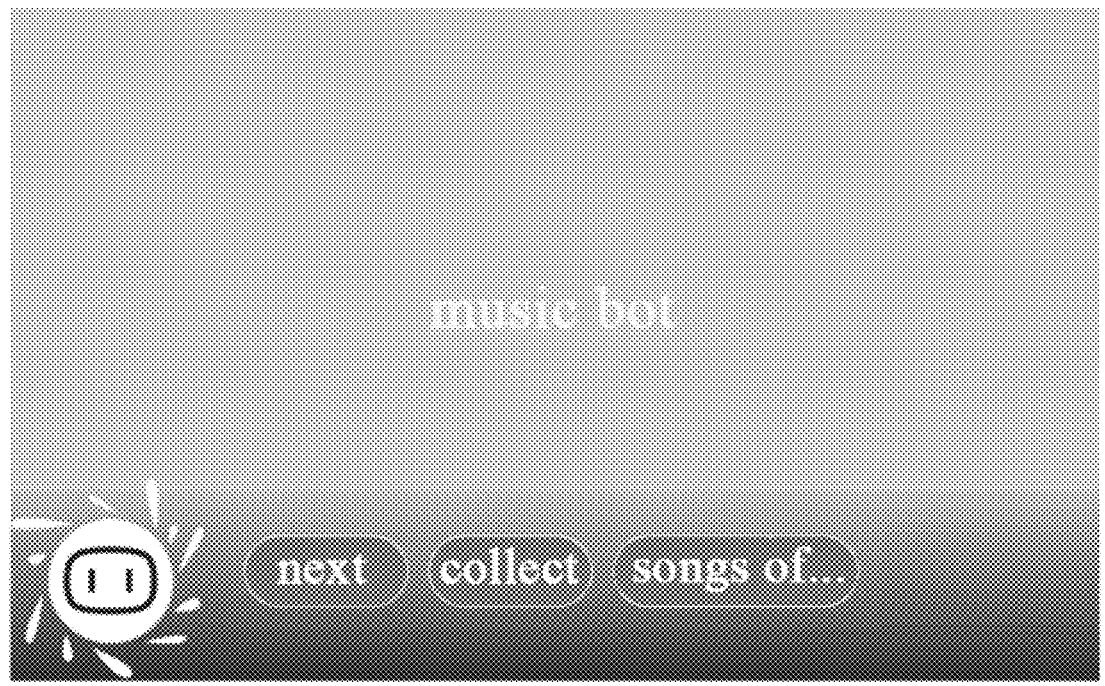
FIG. 4 is a schematic diagram of a display effect of a time-addition animation according to Embodiment 3 of the present disclosure.

Referring to FIG. 4, when the user continuously gazes the screen of the intelligent speaker, the time-addition text does not need to be continuously displayed, and the delaying animation is only displayed until the wake-up-free function is deactivated.

A touch interaction conflict processing is described as follows. Following the existing principle that a touch may lead to the deactivation from the wake-up-free function, and a gazing recognition is not responded from now on, then, the time addition and waking up for the function in response to detecting the user's gazing may not be supported until the user actively wakes up a colorful xiaodu (an intelligent speaker developed by Baidu team) through a voice command next time.

According to the technical solution of the embodiment, a novel human-computer interaction capacity is explored on the intelligent speaker, the gazing recognition is combined with the wake-up-free function, the time for the ON state of the wake-up-free function may be prolonged by waking up the OFF state, and a natural interaction capacity is provided for the user.

Embodiment 4

Figure 5:
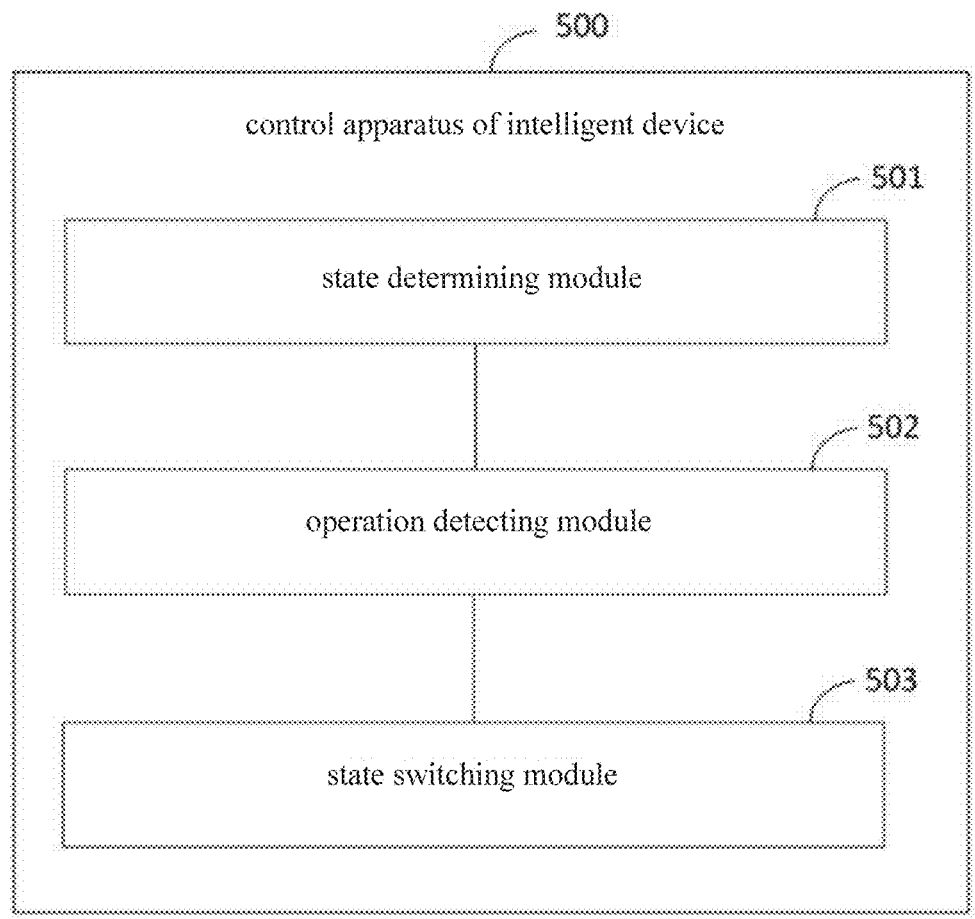
FIG. 5 is a schematic structural diagram of a control apparatus of an intelligent device according to Embodiment 4 of the present disclosure.

FIG. 5 is a schematic structural diagram of a control apparatus of an intelligent device according to Embodiment 4 of the present disclosure. The control apparatus 500 includes: a state determining module 501, an operation detecting module 502 and a state switching module 503.

The state determining module 501 is configured to determine a state of a target function to acquire target function state information.

The operation detecting module 502 is configured to detect an operation of a user gazing at a local screen to acquire gazing operation information.

The state switching module 503 is configured to control the state of the target function to switch according to the gazing operation information and the target function state information.

The technical solution of embodiments of the present disclosure may realize the following beneficial effects: the state-switching requirement of the user on the target function is identified according to the gazing operation of the user at the local screen, and the state of the target function is switched according to the user requirement state and the state of the target function. Therefore, the automatic flexible control of the target function state is realized, and the individual requirements of the various users are met.

Further, the state switching module includes a state switching unit.

The state switching unit is configured to, when the target function state information indicates the ON state, in response to the user gazing at the local screen, delay the time of deactivating the target function.

Further, the state switching unit is specifically configured to: start timing from the starting point of the user gazing at the local screen for the last time; and in response to the timing result exceeding the first duration, deactivate the target function automatically.

Further, the control apparatus is configured to display a time-addition text and a time-addition animation upon detecting that the user starts to gaze at the local screen.

Further, the state switching module includes a time determining unit and the state switching unit.

The time determining unit is configured to, when the target function state information indicates the OFF state and the target function is the automatic deactivation, determine the duration of the user gazing at the local screen.

The state switching unit is configured to in response to the duration exceeding the second duration, switch the target function from the OFF state to the ON state.

Further, the state switching module includes a state control unit.

The state control unit is configured to, when the target function state information indicates the OFF state and the target function is the manual deactivation, control the target function to remain in the OFF state to refuse to be waked up through the gazing operation information; in which the manual deactivation is to deactivate the target function in response to the deactivating command of the user.

According to embodiments of the present disclosure, the present disclosure further provides an electronic device and a readable storage medium.

Figure 6:
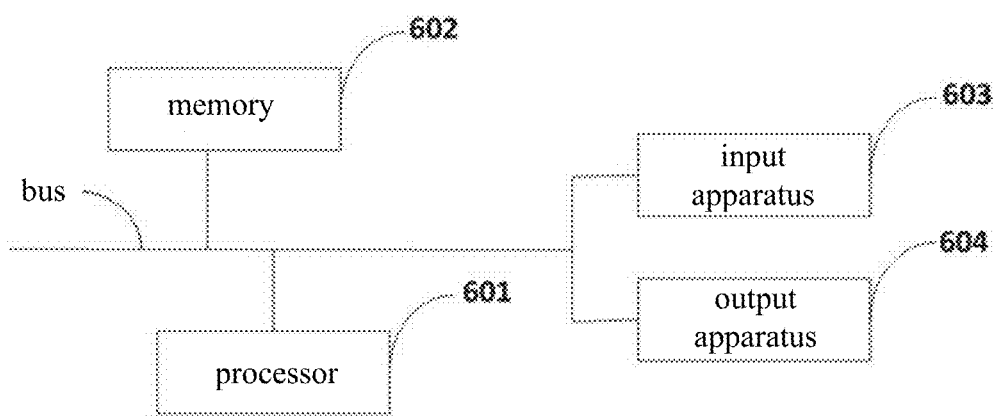
FIG. 6 is a block diagram of an electronic device according to an embodiment of the present disclosure.

FIG. 6 is a block diagram of an electronic device according to the control method of the intelligent device according to embodiments of the present disclosure. Electronic devices are aim to represent various forms of digital computers, such as laptops, desktops, workstations, personal digital assistants, servers, blade servers, mainframes, and other appropriate computers. The electronic device may also represent various forms of mobile devices, such as personal digital processing, cellular phones, smart phones, wearable devices, and other similar computing apparatuses. The components shown herein, their connections and relationships, and their functions, are meant to be examples only, and are not intended to limit implementations of the present disclosure that are described and/or claimed herein.

As shown in FIG. 6, the electronic device includes one or more processors 601, a memory 602, and interfaces for connecting the various components, including a high-speed interface and a low-speed interface. The various components are interconnected using different buses and may be mounted on a common motherboard or in other manners as desired. The processor may process instructions for execution within the electronic device, including instructions stored in or on the memory to display graphical information of a GUI on an external input/output apparatus (such as a display device coupled to the interface). In other implementations, multiple processors and/or multiple buses may be used, along with multiple memories and multiple memories, as desired. Also, multiple electronic devices may be connected, with each device providing portions of the necessary operations (e.g., as a server array, a group of blade servers, or a multi-processor system). In FIG. 6, one processor 601 is taken as an example.

The memory 602 is a non-transitory computer readable storage medium as provided herein. The memory stores instructions executable by at least one processor, so that the at least one processor executes the control method of the intelligent device provided by the present disclosure. The non-transitory computer-readable storage medium of the present disclosure stores computer instructions for causing a computer to execute the control method of the intelligent device provided by the present disclosure.

The memory 602, which is a non-transitory computer readable storage medium, may be used to store non-transitory software programs, non-transitory computer executable programs, and modules, such as program instructions/modules (e.g., the state determining module 501, the operation detecting module 502, and the state switching module 503 shown in FIG. 5) corresponding to the control method of the intelligent device of embodiments of the present disclosure. The processor 601 executes various functional present disclosures of the server and data processing by running non-transitory software programs, instructions, and modules stored in the memory 602, that is, implementing the control method of the intelligent device of the above method embodiment.

The memory 602 may include a storage program area and a storage data area, the storage program area may store an operating system, a present disclosure program required for at least one function; the storage data area may store data created according to use of the control electronics of the intelligent device, and the like. Further, the memory 602 may include high speed random access memory, and may also include non-transitory memory, such as at least one magnetic disk storage device, flash memory device, or other non-transitory solid state storage device. In some embodiments, the memory 602 alternatively includes memory located remotely from the processor 601, and these remote memories may be connected to the control electronics of the intelligent device via a network. Examples of such networks include, but are not limited to, the internet, intranets, local area networks, mobile communication networks, and combinations thereof.

The electronic device for implementing the control method of the intelligent device may further include: an input apparatus 603 and an output apparatus 604. The processor 601, the memory 602, the input apparatus 603 and the output apparatus 604 may be connected via the bus or other means, and FIG. 6 illustrates the connection via the bus as an example.

The input apparatus 603 may receive input numeric or character information and generate key signal inputs related to user settings and function control of the control electronics of the intelligent device, such as a touch screen, a keypad, a mouse, a track pad, a touch pad, a pointer stick, one or more mouse buttons, a track ball, a joystick, or other input apparatuses. The output apparatus 604 may include a display device, auxiliary lighting apparatuses (e.g., LEDs), and tactile feedback apparatuses (e.g., vibrating motors), and the like. The display device may include, but is not limited to, a Liquid Crystal Display (LCD), a Light Emitting Diode (LED) display, and a plasma display. In some implementations, the display device can be a touch screen.

Various implementations of the systems and techniques described here can be realized in a digital electronic circuitry system, an integrated circuitry system, a specific ASICs (specific integrated circuits), computer hardware, firmware, software, and/or combinations thereof. These various implementations may include the following. These various implementations may be implemented in one or more computer programs that are executable and/or interpretable on a programmable system including at least one programmable processor, which may be special or general purpose, receiving data and instructions from, and transmitting data and instructions to, a storage system, at least one input apparatus, and at least one input apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine-readable medium" and "computer-readable medium" refer to any computer program product, device, and/or apparatus (e.g., magnetic discs, optical disks, memory, Programmable Logic Devices (PLDs)) used to provide machine instructions and/or data to the programmable processor, including the machine-readable medium that receives machine instructions as a machine-readable signal. The term "machine-readable signal" refers to any signal used to provide the machine instructions and/or data to the programmable processor.

To provide an interaction with the user, the systems and techniques described here can be implemented on the computer having: a display apparatus (e.g., a CRT (cathode ray tube) or LCD (liquid crystal display) monitor) for displaying information to the user; and a keyboard and a pointing apparatus (e.g., a mouse or a trackball) by which the user can provide input to the computer. Other kinds of apparatuses may also be used to provide for interaction with the user; for example, feedback provided to the user can be any form of sensory feedback (e.g., visual feedback, auditory feedback, or tactile feedback); and input from the user may be received in any form, including acoustic, speech, or tactile input.

The systems and techniques described herein can be implemented in a computing system that includes a back-end component (e.g., as a data server), or that includes a middleware component (e.g., an present disclosure server), or that includes a front-end component (e.g., a user computer having a graphical user interface or a web browser through which the user can interact with the implementation of the systems and techniques described here), or any combination of such back-end, middleware, or front-end components. The components of the system can be interconnected by any form or medium of digital data communication (e.g., a communication network). Examples of communication networks include: local Area Networks (LANs), Wide Area Networks (WANs), and the Internet.

The computer system may include clients and servers. A client and server are generally remote from each other and typically interact through a communication network. The relationship of client and server arises by virtue of computer programs running on the respective computers and having a client-server relationship to each other.

It should be understood that various forms of the flows shown above may be used, with steps reordered, added, or deleted. For example, the steps described in the present disclosure may be executed in parallel, sequentially, or in different orders, and the present disclosure is not limited thereto as long as the desired results of the technical solutions disclosed in the present disclosure can be achieved.

The above described embodiments should not be construed as limiting the scope of the present disclosure. Those skilled in the art should understand that various modifications, combinations, sub-combinations and substitutions may be made in accordance with design requirements and other factors. Any modification, equivalent replacement, and improvement made within the spirit and principle of the present disclosure shall be included in the protection scope of the present disclosure.

What is claimed is:

1. A control method of an intelligent speaker, comprising:
   determining a state of a target function of the intelligent speaker to acquire target function state information;
   detecting an operation of a user gazing at a local screen to acquire gazing operation information; and
   controlling the state of the target function to switch according to the gazing operation information and the target function state information, comprising:
   determining whether the target function is automatic deactivation or manual deactivation when the target function state information indicates an OFF state, wherein the automatic deactivation indicates that the target function is deactivated automatically from the ON state to the OFF state in response to a duration of the user not gazing at the local screen exceeding a first duration, and the manual deactivation indicates that the target function is deactivated manually from the ON state to the OFF state in response to a deactivating command of the user;
   switching the target function from the OFF state to the ON state in response to a duration of the user gazing at the local screen exceeding a second duration in a case that the target function is the automatic deactivation;
   controlling the target function to remain in the OFF state to refuse to be waked up through the gazing operation information even if the duration of the user gazing at the local screen exceeding the second duration in case that the target function is the manual deactivation, so as to avoid an incorrect wake-up of the target function,
   wherein the method further comprises:
   when the target function of the intelligent speaker is in an ON state, resetting timing of a deactivating duration upon detecting that the user gazes at a screen of the intelligent speaker;
   upon detecting that the user gazes at the screen of the intelligent speaker continuously, setting the timing of the deactivating duration to start from a last time of the user gazing at the screen of the intelligent speaker; and
   deactivating the target function of the intelligent speaker after the timing is finished.

2. The control method of claim 1, wherein controlling the state of the target function to switch according to the gazing operation information and the target function state information comprises:
   when the target function state information indicates an ON state, in response to the user gazing at the local screen, delaying a time of deactivating the target function.

3. The control method of claim 2, wherein delaying the time of deactivating the target function comprises:
   in response to a timing result exceeding the first duration, deactivating the target function automatically.

4. The control method of claim 2, comprising:
   displaying a time-addition text and a time-addition animation upon detecting that the user starts to gaze at the local screen.

5. A control apparatus of an intelligent deviccspeaker, comprising:
   one or more processors;
   a memory storing instructions executable by the one or more processors;
   wherein the one or more processors are configured to:
   determine a state of a target function of the intelligent speaker to acquire target function state information;
   detect an operation of a user gazing at a local screen to acquire gazing operation information; and
   control the state of the target function to switch according to the gazing operation information and the target function state information by performing acts of:
   determining whether the target function is automatic deactivation or manual deactivation when the target function state information indicates an OFF state, wherein the automatic deactivation indicates that the target function is deactivated automatically from the ON state to the OFF state in response to a duration of the user not gazing at the local screen exceeding a first duration, and the manual deactivation indicates that the target function is deactivated manually from the ON state to the OFF state in response to a deactivating command of the user;
   switching the target function from the OFF state to the ON state in response to a duration of the user gazing at the local screen exceeding a second duration in a case that the target function is the automatic deactivation;
   controlling the target function to remain in the OFF state to refuse to be waked up through the gazing operation information even if the duration of the user gazing at the local screen exceeding the second duration in case that the target function is the manual deactivation, so as to avoid an incorrect wake-up of the target function,
   wherein the one or more processors are configured to:

when the target function of the intelligent speaker is in an ON state, reset timing of a deactivating duration upon detecting that the user gazes at a screen of the intelligent speaker;

upon detecting that the user gazes at the screen of the intelligent speaker continuously, set the timing of the deactivating duration to start from a last time of the user gazing at the screen of the intelligent speaker; and deactivate the target function of the intelligent speaker after the timing is finished.

6. The control apparatus of claim 5, wherein the one or more processors control the state of the target function to switch according to the gazing operation information and the target function state information by performing an act of:

when the target function state information indicates an ON state, in response to the user gazing at the local screen, delaying a time of deactivating the target function.

7. The control apparatus of claim 6, wherein the one or more processors delay the time of deactivating the target function by performing acts of:

in response to a timing result exceeding a first duration, deactivating the target function automatically.

8. The control apparatus of claim 6, wherein the one or more processors are configured to display a time-addition text and a time-addition animation upon detecting that the user starts to gaze at the local screen.

9. A non-transitory computer readable storage medium having computer instructions stored thereon that, when executed by a computer, cause the computer to perform a control method of an intelligent speaker, the control method comprising:

determining a state of a target function of the intelligent speaker to acquire target function state information;

detecting an operation of a user gazing at a local screen to acquire gazing operation information; and controlling the state of the target function to switch according to the gazing operation information and the target function state information, comprising:

determining whether the target function is automatic deactivation or manual deactivation when the target function state information indicates an OFF state, wherein the automatic deactivation indicates that the target function is deactivated automatically from the ON state to the OFF state in response to a duration of the user not gazing at the local screen exceeding a first duration, and the manual deactivation indicates that the target function is deactivated manually from the ON state to the OFF state in response to a deactivating command of the user;

switching the target function from the OFF state to the ON state in response to a duration of the user gazing at the local screen exceeding a second duration in a case that the target function is the automatic deactivation;

controlling the target function to remain in the OFF state to refuse to be waked up through the gazing operation information even if the duration of the user gazing at the local screen exceeding the second duration to in case that the target function is the manual deactivation, so as to avoid an incorrect wake-up of the target function, wherein the control method further comprises:

when the target function of the intelligent speaker is in an ON state, resetting timing of a deactivating duration upon detecting that the user gazes at a screen of the intelligent speaker;

upon detecting that the user gazes at the screen of the intelligent speaker continuously, setting the timing of the deactivating duration to start from a last time of the user gazing at the screen of the intelligent speaker; and deactivating the target function of the intelligent speaker after the timing is finished.

* * * * *